United States Patent [19]

Edwards et al.

[11] Patent Number: 4,718,064
[45] Date of Patent: Jan. 5, 1988

[54] AUTOMATIC TEST SYSTEM

[75] Inventors: David J. Edwards, Yorba Linda; John M. Tillson; James K. Benning, both of Mission Viejo, all of Calif.

[73] Assignee: Western Digital Corporation, Irvine, Calif.

[21] Appl. No.: 834,902

[22] Filed: Feb. 28, 1986

[51] Int. Cl.$^4$ .................. G01R 31/28; G06F 11/00
[52] U.S. Cl. .................................. 371/20; 371/16; 364/200
[58] Field of Search ............... 371/16, 20; 364/200, 364/900, 578

[56] References Cited

U.S. PATENT DOCUMENTS

| | | | |
|---|---|---|---|
| 4,192,451 | 3/1980 | Swerling et al. | 371/20 |
| 4,455,654 | 6/1984 | Bhaskar et al. | 371/20 |
| 4,484,266 | 11/1984 | Becker et al. | 364/200 |
| 4,517,671 | 5/1985 | Lewis | 371/16 X |
| 4,527,234 | 7/1985 | Bellay | 364/200 |
| 4,603,385 | 7/1986 | Mueller et al. | 364/200 |
| 4,607,366 | 8/1986 | Stadlmeier et al. | 371/16 |

Primary Examiner—Charles E. Atkinson
Attorney, Agent, or Firm—Spensley Horn Jubas & Lubitz

[57] ABSTRACT

An automatic test system for both production and trouble shooting evaluation of various computer peripheral controller devices. The automatic test system includes a central processing unit, a receiver card adapted to receive a particular type of peripheral controller-under-test and a peripheral emulator. The automatic test system may be employed in the testing of a wide range of peripheral controller devices by utilizing differing receiver cards adapted to each specific kind of peripheral under test. In operation command and data signals are sent from the processor to the controller-under-test through the receiver card, causing the controller-under-test to send modified command and data signals to the peripheral emulator. The central processor then accesses memory in the peripheral emulator to ascertain if the controller-under-test sent the proper commands and data. Testing is further carried out by the central processor loading both normal and abnormal data and status signals into the peripheral emulator and subsequently instructing the unit-under-test to extract the data from the emulator and submit it to the central processor.

6 Claims, 8 Drawing Figures

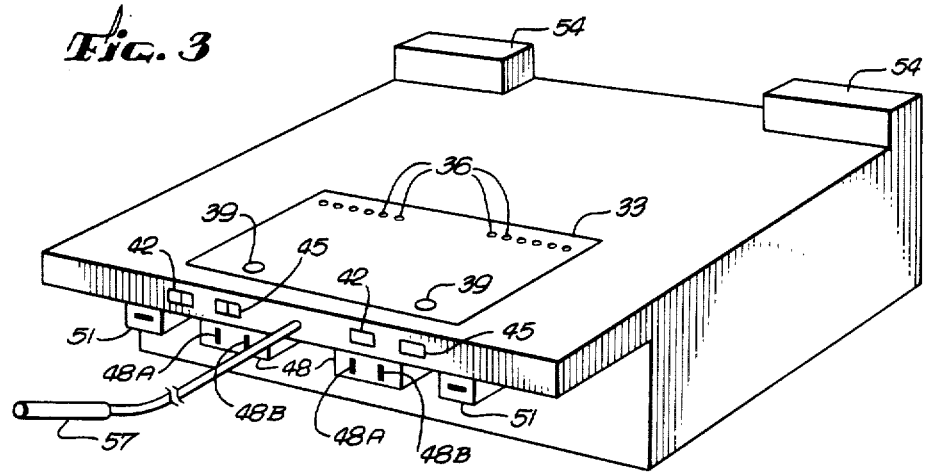
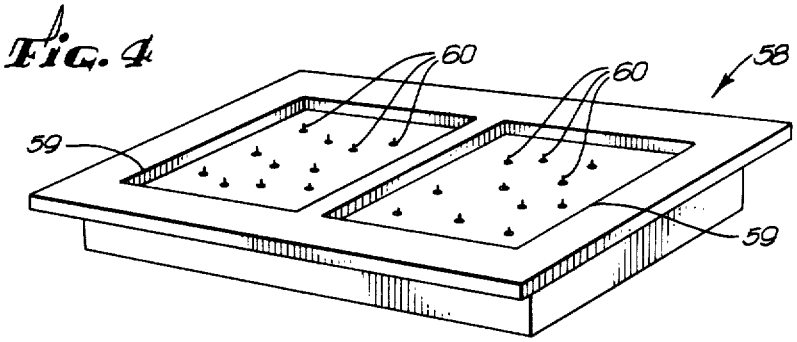
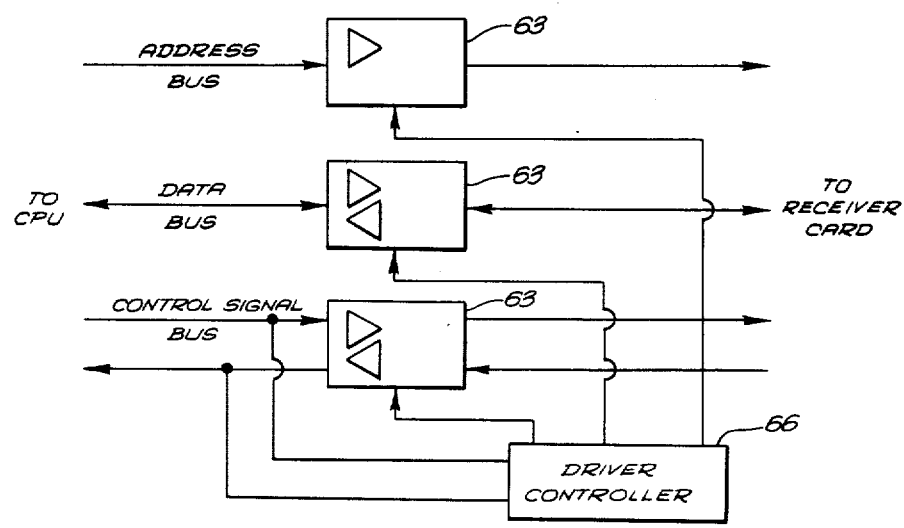

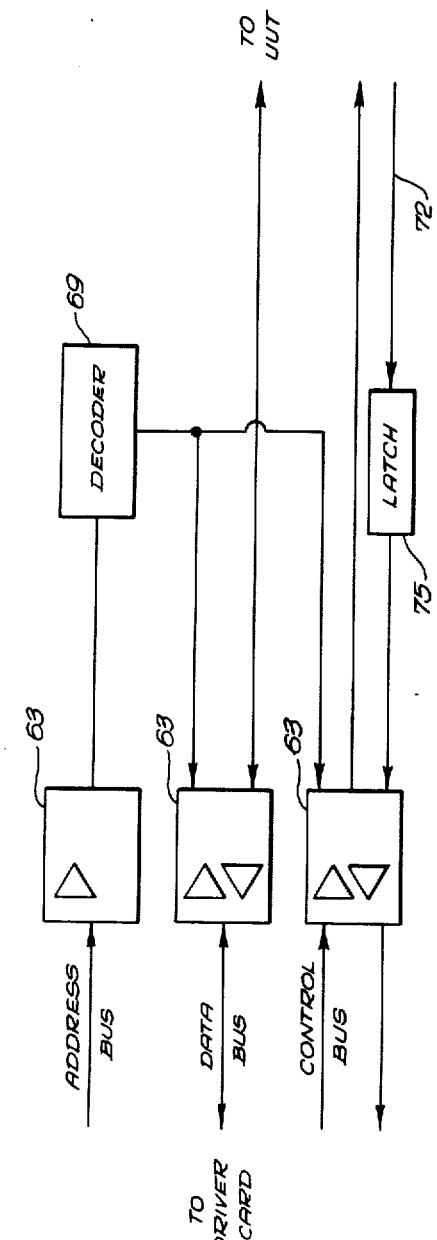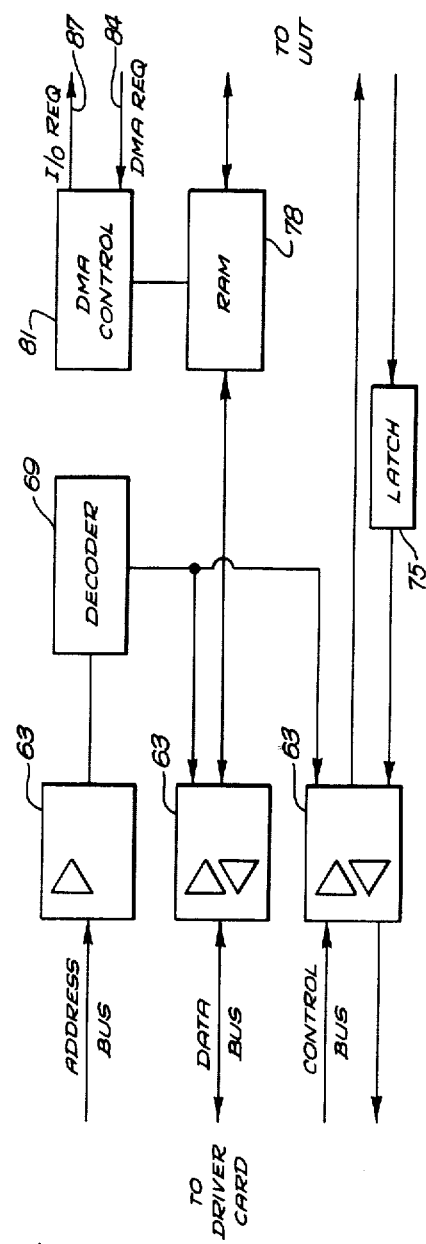
Fig. 6
Fig. 7

AUTOMATIC TEST SYSTEM

BACKGROUND OF THE INVENTION

1. Field of the Invention

The present invention concerns the testing of computer control devices and, more particularly, a generic tester for computer peripheral controllers.

2. Description of the Prior Art

Typical computer systems, e.g., home personal computers, usually include a number of sophisticated peripheral controllers which are responsible for the operation of various peripheral devices under the direction of the central processing unit (CPU) of the computer. Examples of these peripheral devices are the hard or floppy disk drives commonly employed in computer systems for the bulk storage of data. Controller units for disk drives typically direct the operation of the disk drive, providing a conduit and translator for commands and data between the CPU and the disk drive. For example, when providing data for storage the CPU typically sends eight or sixteen bits in parallel, that is, simultaneously. A disk drive, however, can only store this data serially, one bit at a time. One function of the peripheral controller is to temporarily store the eight or sixteen bits of parallel data and transfer the data to the disk serially. Conversely, the controller will also receive data from the disk serially and forward it to the CPU in eight or sixteen parallel bits.

It is difficult to develop a satisfactory apparatus to enable manufacturers of peripheral controllers to test their products for proper operation. Peripheral controllers have previously been tested by simply plugging them into a host computer system of the type they were intended to operate in. This procedure, however, suffers from a number of disadvantages. Defective controllers may very well damage the electronics of the host/test computer system. In subsequent testing it therefore becomes necessary to determine whether the peripheral controller under test or the host/test computer system is defective. With this procedure the number of abnormal conditions to which the peripheral controller-under-test can be subjected (and expected to tolerate) is also limited. In addition, the information relating to the specific defect in a failed unit-under-test is also sketchy.

Peripheral controllers have also been tested with actual peripherals and various kinds of isolated "black box" devices providing command and data signals identical to those which would be provided by the host computer that the unit-under-test (UUT) is expected to work with. This testing procedure also suffers from a number of disadvantages since the unit-under-test may still damage the peripherals so that it is again necessary in subsequent tests to first verify that the peripheral is functioning properly. Black box type host computer simulators also provide only limited control over a wide range of abnormal conditions the unit-under-test is expected to encounter and tolerate. In addition, such host commputer simulators are also not adaptable from one peripheral controller product to another. Typically a period of up to eight months are needed to develop a new host computer simulator.

Thus there still exists a need for a peripheral controller test system capable of testing controller products without employing an actual peripheral or host computer. A need further remains for an automatic test system which can be more quickly modified for testing different kinds of peripheral controllers.

SUMMARY OF THE INVENTION

It is therefore an object of the present invention to provide an automatic test system for testing computer peripheral controllers without employing an actual peripheral device. It is a further object of the present invention to provide an automatic test system which can be modified for use with a variety of peripheral controller devices without requiring substantial modifications. A further object of the present invention is to provide an automatic test system for peripheral controllers which can subject a unit-under-test to a variety of abnormal conditions associated with the function of the peripheral device which the unit-under-test is expected to tolerate. A further objective of the present invention is to provide an automatic test system which can be used both for production "go/no go" testing to simply separate operative versus defective units-under-test and also function in a trouble shooting mode to facilitate determination of the specific nature of a defect in a unit-under-test.

These and other goals and objectives are achieved by providing a modular test system with a receiver card (i.e. circuit) specifically configured for a particular type of peripheral controller undergoing testing. The receiver card acts as an interface between the unit-under-test and the remainder of the automatic test system. Different types of peripheral controllers can be tested with the same automatic test system by employing differing receiver cards specific for each type of controller.

The test system includes components of a conventional personal computer acting as the central processing unit (CPU). A driver card is also provided to extend signals from the CPU to the receiver card. The receiver card is mounted inside a vacuum actuated bed-of-nails fixture that has been physically customized to accept a particular unit-under-test. The receiver card electrically contacts the unit-under-test by way of the vacuum suction forcing the unit-under-test card onto the bed-of-nails contacts. The receiver card buffers signals between the UUT and the CPU. A peripheral emulator is also included in the automatic test system. In the presently preferred embodiment of the automatic test system, the emulator may simulate either a hard or floppy disk drive. To test the tolerance of the UUT to varying power supply levels, a programable power supply is also included.

In testing, the CPU is employed to send commands and data to the UUT and then examine the corresponding command signals and data sent to the emulator by the UUT. The CPU also inputs data and control signals to the emulator and directs the UUT to retrieve data. The CPU then compares the data retrieved by the UUT with the input to the emulator. In this manner, the automatic test system can simulate the live environment of the UUT and exercise the UUT as if it were in that environment under a wide range of conditions. By providing for the placement of data and control signals into the emulator, the automatic test system can also simulate most of the error conditions the UUT is likely to experience in subsequent operation and assess the tolerance of the UUT to conditions outside the optimum for the intended peripheral.

The novel features which are believed to be characteristic of the present invention, together with further objectives and advantages thereof, will be better understood from the following detailed description considered in connection with the accompanying drawings, wherein like numbers designate like elements. It should be expressly understood, however, that the drawings are for purposes of illustration and description only and are not intended as a definition of the limits of the present invention.

BRIEF DESCRIPTION OF THE DRAWINGS

FIG. 3 is a perspective view of the present inventive automatic test system;

FIG. 4 is a perspective view of a bed-of-nails test fixture of the present inventive automatic test system;

FIG. 5 is a diagrammatic illustration of the driver (or extender) card of the present invention;

FIG. 6 is a diagrammatic illustration of a preferred embodiment of a receiver card of the present invention;

FIG. 7 is a diagrammatic illustration of a second preferred embodiment of a receiver card of the present invention.

DETAILED DESCRIPTION

Figure 1:
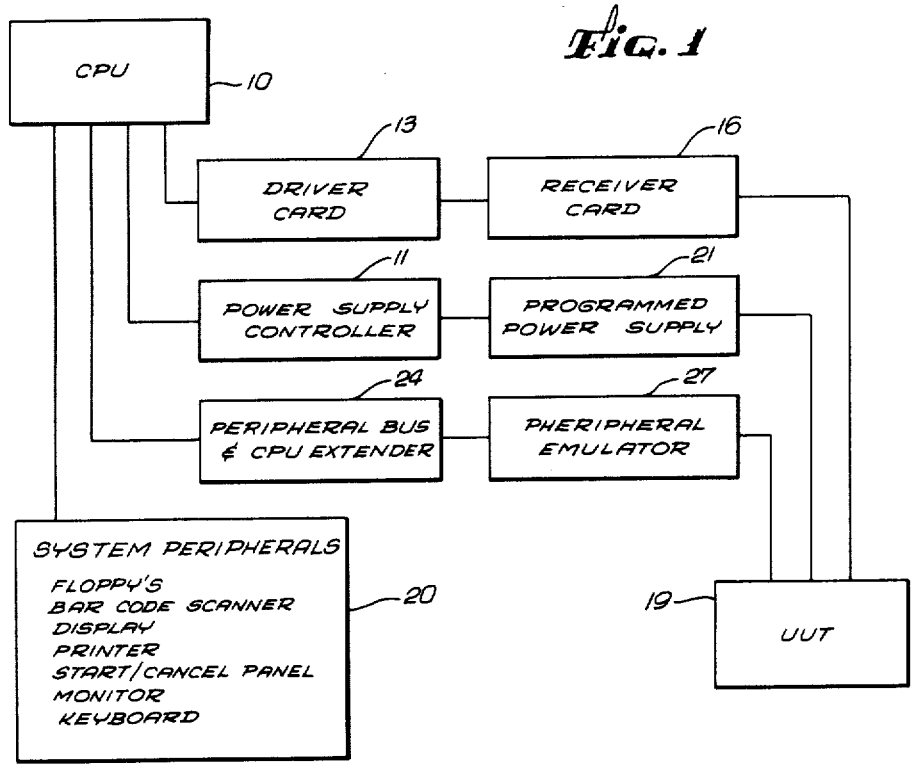
FIG. 1 is a diagrammatic illustration of a preferred embodiment of the present inventive automatic test system.

Referring to FIG. 1, there is shown a block diagram illustrating a preferred embodiment of the present inventive automatic test system. The automatic test system includes a central processing unit 10 and a driver (or extender) circuit or card 13 to interface signals between the CPU 10 and a receiver card 16 specifically adapted for testing a particular type of peripheral controller undergoing testing, referred to as a unit-under-test 19. The unit-under-test is a circuit board product having a particular physical configuration which must be interfaced by the test system. In the present embodiment of the invention the CPU is an eight-bit machine. The receiver card is of the necessary electrical configuration to interface the unit-under-test with the CPU. The CPU 10 also controls the operation of various peripheral devices 20 employed in the operation of the test system. A programmed power supply 21, receiving power level instructions from the CPU 10 via a power supply controller 11, provides power to the unit-under-test 19. The automatic test system also includes a peripheral bus 24 to couple signals to and from the CPU 10 with a peripheral emulator 27. In the presently preferred embodiment of the automatic test system, the peripheral emulator 27 can simulate both a hard disk and floppy disk drive.

The automatic test system is intended to test virtually any type of hard or floppy disk drive controller for use in virtually any type of personal computer. A family or type of controller is delineated by the host interface, i.e., 8-bit bus family or 16-bit bus family. For each differing type of peripheral controller tested, a new receiver card is developed to physically interface and provide electrical contacts to the peripheral controller undergoing testing. The receiver card 16 also protects the CPU 10 from spurious signals from a defective unit-under-test 19. As discussed more fully below, the receiver card 16 can further be configured to allow the eight-bit CPU to simulate the operation of a sixteen-bit CPU so that peripheral controllers intended for operation with a sixteen-bit host computer system can also be tested by the automatic test system.

For each particular controller board product, a custom vacuum-actuated "bed-of-nails" test fixture is developed to conform to the unique physical layout of that product. Pogo-pin style contacts perform the electrical connections to the unit-under-test as vacuum suction is engaged to draw the controller to the test fixture. Normally, every singular product requires a custom bed-of-nails fixture due to inherent differences in topology and electrical probing requirements.

Figure 2:
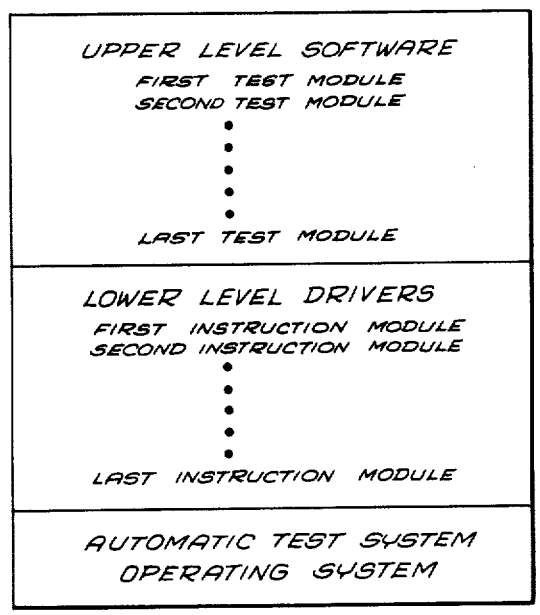
FIG. 2 is a diagram of software structure used to control the automatic test system.

An essential element to the ability of the automatic test system to test a wide range of products is the software used in controlling operation of the test system. As shown in FIG. 2, this software is divided into three separate elements named UPPER LEVEL SOFTWARE, LOWER LEVEL DRIVERS, and OPERATING SYSTEM. As differing types of peripheral controllers are tested, the upper level software and lower level drivers may be altered. The operating system software, however, remains unaltered.

The upper level software contains a plurality of test modules (programs) each setting forth instructions to the CPU 10 for a specific test to be performed on the unit-under-test 19. Each of the test modules of the upper level software is independent. Thus no one test is dependent on any of the preceding or subsequent tests to run properly. The lower level drivers contain a plurality of instruction modules instructing the CPU 10 on how to provide command signals to the unit-under-test 19 in the protocol of the host computer system with which the unit-under-test 19 is intended to normally operate. Each of these instruction modules is also independent. Thus in executing any of the upper level software test modules, one or more of the lower level driver instruction modules will be employed to send a properly formatted command to the unit-under-test. When peripheral controllers of the same family are tested, that is, peripheral controllers intended for normal operation with the same type of host computing system though controlling differing types of peripherals, generally only the upper level software test modules will need be revised. Commonly a number of the test modules may also be employed with more than one type of peripheral controller within the same family. When a peripheral controller of a different family (that is one intended for operation in a different type of host computing system) is to be tested, both the upper level software and the lower level drivers must be revised.

The third element of the software, the operating system, contains the instruction set for the CPU 10 governing the manner in which the automatic test system operates overall. In the presently preferred embodiment, the software includes instruction sets for two different testing procedures. The first testing procedure, production testing, provides for implementation of each of the test modules in the upper level software. If the unit-under-test successfully completes all of these tests the automatic test system simply indicates a pass. If, however, the unit-under-test fails to properly complete any of these test modules, the automatic test system indicates a failure. The automatic test system, however, can also operate in a second testing mode, called "Touble Shooting Mode". In this mode a technician can interact with the automatic test system and direct the system to run through the upper level software test modules until one has failed, indicate which test module the unit under test failed to complete, and further give some indication of how the unit-under-test failed to properly execute the instructions of the relevant test module. In trouble shooting mode, the automatic test system further allows a technician to repeatedly subject a unit under test to a single test module so as to allow close inspection of the unit-under-test to identify the defective element.

FIG. 3 is a perspective view of a presently preferred embodiment of the automatic test system. In this embodiment, two complete testing systems are enclosed in a single housing. Typically in production testing all of the test modules in the upper level software can be executed on a unit-under-test in under half a minute. Thus, one test system may be employed in actively testing a peripheral controller while a technician loads another peripheral controller into the second test system. Thereafter the first test system will complete its tests allowing the technician to remove and appropriately store the peripheral controller just tested by the first test system while the second test system begins testing the pheripheral controller the technician had just placed on the second test system.

As shown in FIG. 3, the automatic test system includes a universal interface plate 33 for receiving a vacuum test fixture (FIG. 4) which actually physically contacts the peripheral controllers undergoing testing. The plate 33 is provided with a series of electrical contacts 36 to engage corresponding electrical contacts on the test fixture and is further provided with vacuum ports 39. The test system is also provided with dual start/cancel switches 42, 45, separate dual floppy disk drives 48A and 48B, dual tape printers 51 and dual displays 54. An optical bar code reader 57 is also provided for scanning and reading the bar code placed on each peripheral controller undergoing testing.

An exemplary test fixture 58 is illustrated in FIG. 4. The test fixture is intended for a loose vacuum fit on the interface plate 33 of the automatic test system and is, in turn, provided with two shallow wells 59, each for receiving and forming a loose vacuum fit with a peripheral controller to undergo testing. The wells of each test fixture are configured to correspond to the outline of a particular unit to be tested. The wells are provided with a plurality of spring loaded conducting pins 60 which physically contact the unit under test. These spring loaded pins provide an electrical contact at appropriate points between the automatic test system and the unit undergoing test.

The automatic test system of FIG. 3 actually includes two independent test systems. In operation a test fixture dedicated to the particular type of peripheral controller about to undergo testing is installed and both automatic test systems are turned on. The software package corresponding to the peripheral controllers to be tested is loaded into the automatic test system by one drive of the floppy disk drive 48A and one drive of the floppy disk drive 48B. The second drive of each of the drives 48A and 48B is used to receive and store test results. After the software has been loaded, a peripheral controller to undergo testing is seated in one well of the test fixture and the start button engaged. The automatic test system, under direction of the operating system portion of the software package, then engages the vacuum and prompts the technician, via display 54, to identify the unit-under-test. The bar code scanner 57 is then used to input the identification data and the automatic test system compares the identified type of unit-under-test with the type of test fixture and receiver card 16 engaged and software package to determine that a proper type of unit-under-test has been loaded. If the proper type of unit-under-test has been loaded the automatic test system will then subject the unit-under-test to all of the test modules in the upper level software of the software package until the tests are completed or the unit has failed. In either event the vacuum is shut off and the unit-under-test released with the results displayed on the display 54. The results of this test along with the identity of the unit-under-test may then be stored on the storage diskette in the second drive of the drive 48A. A hard copy of the test results indicating the identity of the unit-under-test, time, date and technician is then printed out by the printer 51. As stated above, during the time that a first test is being run by one of the test systems a technician may commence loading the second test system with another unit-under-test. If at any point during the testing the technician should wish to stop the tests, the cancel button may be engaged and the peripheral controller undergoing testing will be immediately released. If a different type of unit is to be tested, then the test fixture (with receiver card) and software in the disk drives 48 are replaced and testing on the new peripheral controllers initiated as discussed above with the appropriate test fixture and software package diskette.

In its presently preferred embodiment, components of a conventional personal computer are employed as the central processing unit 10 of the automatic test system. Many such computers provide adequate computational ability and are provided with a sufficient number of expansion slots to accommodate all the peripherals employed in running the automatic test system. A specific personal computer which has been successfully employed is an IBM model PC employing an eight-bit microprocessor. When necessary (i.e., when the unit-under-test is designed for use with a sixteen-bit CPU), the receiver card can be configured to allow this eight-bit microprocessor to simulate a sixteen-bit microprocessor.

In order to extend signals from a mother board of the CPU 10 to the receiver card 16, a driver or extender card 13 is employed. An exemplary extender card 13 is illustrated in FIG. 5. The extender card 13 is plugged into the mother board of the CPU 10 and engages the address bus, data bus, and control signal lines of the CPU 10. As shown in FIG. 3, the extender card includes several electronic tri-state digital drivers 63 each separately engaging one of the aforementioned buses and the control signal lines. The digital drivers 63 are high current devices having an ability to drive large currents without failing. A driver controller 66 is provided to enable the digital drivers 63. The driver controller 66 enables the digital drivers 63 based on control signals which are sensed on the control signal lines connected to the CPU. Each of the digital drivers 63 is provided with a bus extending to the receiver cards which may be a distance of up to four feet away.

A block diagram illustrating an exemplary receiver card is shown in FIG. 6. This receiver card would be appropriate for a peripheral controller intended for use in a host computer system also having an eight-bit central processing unit as the eight-bit CPU 10 currently employed in the automatic test system. As shown, the receiver card 16 includes digital drivers 63 connected to the address bus, data bus, and control signal lines extending from the digital drivers of the extender card 13. A decoder 69 is attached to the output of the digital driver 63 engaging the address bus. The decoder 69 enables the digital drivers 63 attached to the data bus and control signal lines when the address bus carries address signals indicating that the CPU 10 is sending either commands or data to the unit-under-test. The return control signal line 72 from the unit-under-test 19 to the CPU 10 includes a latch 75. This latch is used to store interrupt signals normally sent by the peripheral controller undergoing testing to a host computer central processing unit. This precludes the CPU 10 of the automatic test system from being interrupted from the test sequence. At appropriate times the CPU 10 can poll the latch 75 to determine the presence or absence of intended interrupt signals.

FIG. 7 shows an illustrative receiver card for use in testing a peripheral controller intended for a sixteen-bit host computer, unlike the eight-bit CPU 10 of the automatic test system. This receiver card also includes digital drivers 63 engaging the address bus, data bus and control signal lines from the driver card 13. A decoder 69 is again employed to enable the digital drivers 63 connected to the data bus and control signal lines when appropriate address codes are sent by the CPU 10. In this receiver card, however, a random access memory (RAM) 78 is connected to the data bus. A direct memory access control 81 is included to enable a data dump from the random access memory 78. In use, the CPU loads data into the RAM 78 for subsequent use by the unit-under-test at a higher transfer rate. When the RAM 78 is loaded the CPU 10 can then send an appropriate control signal through the control lines directing the unit-under-test 19 to enable the DMA request line 84 thereby instructing the direct memory access control 81 to enable output from the RAM 78. The I/O request line (87) is used to provide a signal to the unit-under-test indicating that the data is valid, this line being part of the particular configuration of the type of peripheral controller undergoing testing. A latch 75 is again included to sense interrupt signals coming from the unit-under-test.

Figure 8:
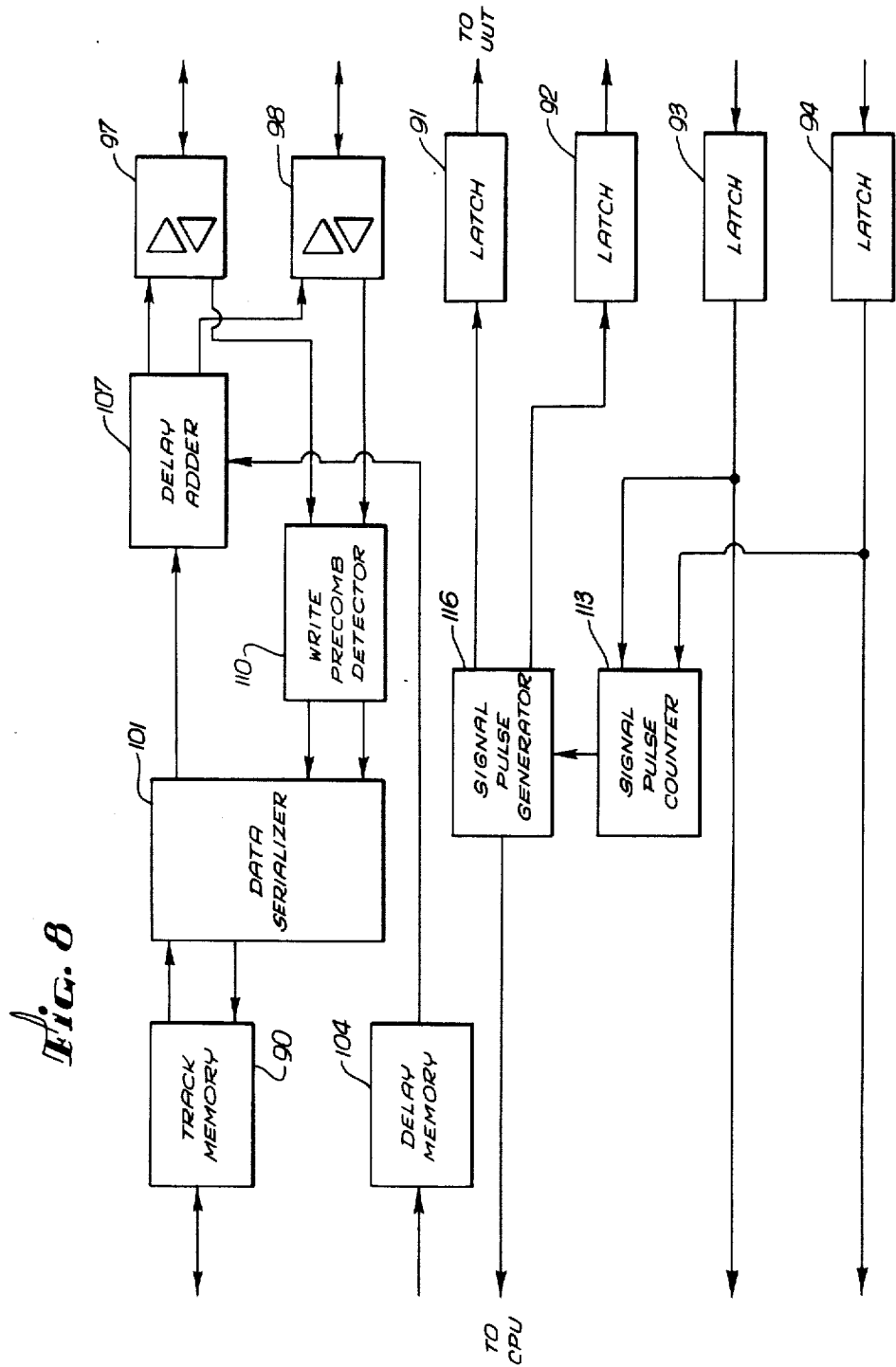
FIG. 8 is a diagrammatic illustration of an emulator of the present inventive automatic test system simulating both a hard and floppy disk drive.

FIG. 8 shows an illustrative peripheral emulator. This peripheral emulator can simulate either a hard and floppy disk drive system. In general terms, the disk drive emulator includes a memory 90 for storing a desirable amount of data (preferably one track for a disk drive) input into the emulator 27 through the CPU or, alternatively, data received from the unit under test 19. A series of latches 91-94 are also included to store status or drive condition signals which a disk drive would normally send to the unit-under-test during various operating conditions and further store commands sent by the unit-under-test which would normally direct the disk drive to initiate various operations. Digital drivers 97, 98 are also included to transmit data signals over the extended distance separating the emulator 27 and the unit-under-test 19. Since data is normally stored and extracted from the track memory 90 in parallel and normally sent to and received from the unit-under-test 19 in series, a data serializer 101 is provided between the memory 90 and the digital drivers 97, 98 to provide the proper sequence of data output.

One of the most persistent problems in the use of a disk drive for data storage is commonly referred to as "bit jitter". This phenomena concerns the temporal displacement of data pulses read from the disk drive by the peripheral controller. This perturbation in the timing relationship commonly arises due to variations in the speed of the disk drive, hysteresis effect in the read/write heads of the disk drive, media defects, spurious electromagnetic noise pulses and bit shifting on the media caused by close proximity of adjacent bits repelling or attracting each other magnetically. Typically, controllers are designed to tolerate up to 39 nanoseconds of bit jitter. Previous peripheral controller test systems, however, have commonly lacked any means of satisfactorily testing a controller's tolerance to bit jitter. The present inventive automatic test system includes a delay memory 104 and delay adder 107 to measure a unit-under-test's tolerance to bit jitter. With each bit of data stored in the memory 90, a corresponding timing bit is stored in the delay memory 104. When this data is subsequently sent to the unit-under-test, each data bit from memory 90 is delayed by the time interval amplitude stored in the delay memory 104 by the delay adder 107 thus allowing one nanosecond resolution in the timing between various data bits. Thus a form of bit jitter may be developed and made progressively worse by appropriate storage of data in the delay memory 104 to determine when the unit-under-test begins rejecting data from the emulator due to intolerable displacement of data pulses.

A number of disk drive controllers presently incorporate a feature known as "write precompensation code" to preserve the timing relationship between data bits written near the center of a data storage disk. Typically as the magnetic domain making up the data are placed closer and closer together a point is reached at which the magnetic domains are physically displaced from their initial location due to interaction with adjacent magnetic domains. This physical displacement results in a shift in the timing relationship between adjacent data bits. Peripheral controllers provided with write precompensation for this physical displacement by writing the data either early or late so that, once written, the magnetic domain is shifted to its proper position. A write precompensation detector 110 is included in the peripheral emulator 27 to monitor the write data from the unit-under-test 19 and determine if the write precompensation feature is properly working. The write precompensation detector 110 measures the interval between leading edges of adjacent data pulses. A counter counts each time the write precompensation detector 110 detects two data pulses in which the first data pulse is late and the second data pulse is early. The CPU 10 then reads the counter of the write precompensation detector 110 and matches this count with the number of times first and second data pulses should have respectively arrived late and early.

In normal operation, a drive controller may determine that the drive heads are positioned over a first track and instruct the heads to move to a different track. Normally this is accomplished by a direction command and sending a number of pulses directing the disk drive to move the heads one track for each pulse. To simulate this effect in the peripheral emulator of the present inventive automatic test system a pulse counter 113. The counter 113 can then be used to count the number of stepping pulses sent by the unit-under-test. Pulse generator 116 may be included in the emulator to return an appropriate index signal each time a full rotation of the disk is simulated.

In operation, the CPU 10 can provide through the receiver card 16 various commands and data to the unit-under-test. The CPU 10 can then access the track memory 90 and latches 93, 94 of the peripheral emulator 27 to determine whether or not proper command signals were sent to the peripheral emulator along with accurate transmission of the data initially submitted to the unit-under-test 19. The CPU 10 can also store various status signals in the latches 91, 92 of the peripheral emulator 27 then command the unit-under-test 19 to initiate a particular action and verify whether or not this action is initiated or postponed as appropriate in response to the apparent status signals residing in the peripheral emulator 27. The tolerance of the unit-under-test 19 to various abnormal conditions can be carefully assessed by having the CPU 10 input various forms of degraded or inaccurate data in the track memory 90 (including use of bit jitter tolerance by employing delay memory 104) and then directing the unit-under-test 19 to retrieve this data from the peripheral emulator 27. By employing modular software and receiver cards adapted for the particular type of peripheral controller undergoing testing, the automatic test system of the present invention can be used in an efficient manner to test a wide range of products.

It will, of course, be understood that modifications of the present invention will be apparent to others skilled in the art. Consequently, the scope of the present invention should not be limited by the particular embodiments discussed above, but should be defined only by the claims set forth below and equivalents thereof.

What is claimed is:

1. An automatic test system for testing controllers for computer peripherals, comprising:
    processing means for generating data and control signals directing a controller-under-test to initiate a plurality of predetermined actions;
    receiver means, removably attached to the test system, for communicating the data and control signals from the processor means to the controller-under-test, said receiver means being configured for use with a specific type of peripheral controller; and
    emulator means, connected to the processor means and detachably coupled to the controller-under-test, for emulating a peripheral device to be controlled by the controller, said emulator means for receiving data, status, and control signals from the processor means and the controller-under-test, wherein the emulator means receives data and commands from the controller-under-test and makes data and status signals available to the controller under direction of the processor means to test the performance of the controller-under-test.

2. The automatic test system of claim 1 wherein the receiver means includes an electronic latch to prevent signals from the controller-under-test from halting the operation of the processor means.

3. The automatic test system of claim 1 wherein the receiver means further includes memory means for storing data from the processor means, wherein the processor means is able to simulate the timing of data signals from a different type of processor means.

4. The automatic test system of claim 1 wherein the emulator means further includes means for measuring the timing relationship between data pulses received from the controller-under-test.

5. The automatic test system of claim 1 wherein the emulator means further includes means for altering the timing between data pulses received from the processor means and sent to the controller-under-test.

6. A modular automatic test system for the testing of controllers for computer peripheral devices comprising:
    procesing means for generating control signals corresponding to tests to be performed or a controller-under-test and receiving signals corresponding to the results of tests;
    a plurality of interchangeable receiver means for interfacing said processing means to various controllers to be tested, each receiver means being alternately connectable to the processing means and including a receptacle for receiving a controller;
    communications means for electrically coupling the controller to the processing means to enable communication therebetween; and
    emulator means, connectable to the processing means and to a controller-under-test, for emulating a peripheral device to be controlled by the controller, said emulator means for receiving commands and data from the controller-under-test as instructed by the processing means and providing information to the processing means indicative of whether said commands and data were properly generated by the controller, said emulator means also for providing signals to the controller-under-test to indicate various operations of the controller wherein signals from the controller and emulator means are analyzed by the processing means to determine if the controller is operating properly.

* * * * *